(12) United States Patent
Kavantzas et al.

(10) Patent No.: US 9,021,055 B2
(45) Date of Patent: Apr. 28, 2015

(54) NONCONFORMING WEB SERVICE POLICY FUNCTIONS

(75) Inventors: Nickolas Kavantzas, Emerald Hills, CA (US); Prakash Yamuna, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 6 days.

(21) Appl. No.: 13/149,065

(22) Filed: May 31, 2011

(65) Prior Publication Data

US 2012/0131135 A1    May 24, 2012

Related U.S. Application Data

(60) Provisional application No. 61/417,176, filed on Nov. 24, 2010.

(51) Int. Cl.
  *G06F 15/16* (2006.01)
  *G06F 9/54* (2006.01)

(52) U.S. Cl.
  CPC ..................................... *G06F 9/541* (2013.01)

(58) Field of Classification Search
  None
  See application file for complete search history.

(56) References Cited

U.S. PATENT DOCUMENTS

| | | | |
|---|---|---|---|
| 5,797,128 A | 8/1998 | Birnbaum | |
| 5,889,953 A | 3/1999 | Thebaut et al. | |
| 6,064,656 A | 5/2000 | Angal et al. | |
| 6,167,445 A | 12/2000 | Gai et al. | |
| 6,516,416 B2 | 2/2003 | Gregg et al. | |
| 6,578,076 B1 | 6/2003 | Putzolu | |
| 6,944,183 B1 | 9/2005 | Iyer et al. | |
| 6,952,728 B1 | 10/2005 | Alles et al. | |
| 7,197,741 B1 | 3/2007 | Stapf | |
| 7,213,068 B1 | 5/2007 | Kohli et a | |
| 7,290,288 B2 | 10/2007 | Gregg et al. | |
| 7,350,204 B2 | 3/2008 | Lambert et al. | |
| 7,424,702 B1 | 9/2008 | Vinodkrishnan et al. | |
| 7,444,643 B2 | 10/2008 | Lo et al. | |

(Continued)

OTHER PUBLICATIONS

Phan et al, Quality-Driven Business Policy Specification and Refinement for Service-Oriented Systems. 2008. Springer-Verlag Berlin Heidelberg. All Pages.*

(Continued)

*Primary Examiner* — Mohamed Wasel
*Assistant Examiner* — Tsung Wu
(74) *Attorney, Agent, or Firm* — Kilpatrick Townsend & Stockton LLP (57) ABSTRACT

Arrangements for enforcing a nonconforming web service policy document are presented. A request for a web service policy document may be received by a web service. A conforming web service policy document may be generated using the nonconforming web service policy document. The nonconforming web service policy document may comprise one or more functions unsupported by the web service description language. The conforming web service policy document may be transmitted to the web service client. The nonconforming web service policy document may be enforced by the web service, wherein the functions that are unsupported by the web service description language standard modifies enforcement of the web service policy document by the web service computer system. The conforming web service policy document may comprise sufficient information for the web service client computer system to comply with the nonconforming web service policy document.

15 Claims, 6 Drawing Sheets

(56) References Cited

U.S. PATENT DOCUMENTS

| | | | |
|---|---|---|---|
| 7,478,419 B2 | 1/2009 | Anderson et al. |
| 7,543,276 B2 | 6/2009 | Pfander et al. |
| 7,725,605 B2 | 5/2010 | Palmeri et al. |
| 7,796,760 B2 | 9/2010 | Brettle et al. |
| 7,855,972 B2 | 12/2010 | Pettit et al. |
| 7,877,264 B2 | 1/2011 | Fox et al. |
| 8,005,930 B2 | 8/2011 | Abeln et al. |
| 8,104,080 B2 | 1/2012 | Burns et al. |
| 8,156,538 B2 | 4/2012 | Kanade et al. |
| 8,265,969 B2 | 9/2012 | Comstock et al. |
| 8,307,413 B2 | 11/2012 | Smadja et al. |
| 8,560,819 B2 | 10/2013 | Fillipi et al. |
| 8,635,682 B2 | 1/2014 | Kavantzas et al. |
| 8,650,250 B2 | 2/2014 | Yamuna et al. |
| 8,650,288 B2 | 2/2014 | Yamuna et al. |
| 8,726,349 B2 | 5/2014 | Kavantzas et al. |
| 2002/0124067 A1 | 9/2002 | Parupudi et al. |
| 2003/0115179 A1 | 6/2003 | Prabakaran et al. |
| 2003/0115484 A1 | 6/2003 | Moriconi et al. |
| 2003/0229501 A1 | 12/2003 | Copeland et al. |
| 2004/0039594 A1 | 2/2004 | Narasimhan et al. |
| 2004/0103046 A1 | 5/2004 | Christoph et al. |
| 2004/0189708 A1 | 9/2004 | Larcheveque et al. |
| 2005/0080914 A1 | 4/2005 | Lerner et al. |
| 2005/0086197 A1 | 4/2005 | Boubez et al. |
| 2005/0091352 A1 | 4/2005 | Alex et al. |
| 2005/0223109 A1 | 10/2005 | Mamou et al. |
| 2006/0041565 A1 | 2/2006 | Cuomo et al. |
| 2006/0053120 A1* | 3/2006 | Shum et al. ............ 707/100 |
| 2006/0075465 A1* | 4/2006 | Ramanathan et al. ........ 726/1 |
| 2006/0088276 A1 | 4/2006 | Cho et al. |
| 2006/0089938 A1 | 4/2006 | Leonard et al. |
| 2006/0206440 A1 | 9/2006 | Anderson et al. |
| 2006/0230430 A1 | 10/2006 | Hondo et al. |
| 2007/0006278 A1 | 1/2007 | Ioan Avram et al. |
| 2007/0157287 A1 | 7/2007 | Lim |
| 2007/0266032 A1 | 11/2007 | Blumenau |
| 2007/0266422 A1 | 11/2007 | Germano et al. |
| 2007/0282879 A1 | 12/2007 | Degenkolb et al. |
| 2008/0046961 A1 | 2/2008 | Pouliot |
| 2008/0066189 A1 | 3/2008 | Liu et al. |
| 2008/0071805 A1 | 3/2008 | Mourra et al. |
| 2008/0091682 A1 | 4/2008 | Lim |
| 2008/0148345 A1 | 6/2008 | Rubio |
| 2008/0155641 A1 | 6/2008 | Beavin et al. |
| 2008/0184201 A1 | 7/2008 | Burns et al. |
| 2008/0189760 A1 | 8/2008 | Rosenberg et al. |
| 2008/0225748 A1 | 9/2008 | Khemani et al. |
| 2008/0244692 A1 | 10/2008 | Chang |
| 2008/0244693 A1 | 10/2008 | Chang |
| 2008/0256593 A1 | 10/2008 | Vinberg et al. |
| 2008/0288651 A1 | 11/2008 | Brauel et al. |
| 2008/0301757 A1 | 12/2008 | Demarest et al. |
| 2009/0070853 A1 | 3/2009 | Chung et al. |
| 2009/0099860 A1 | 4/2009 | Karabulut et al. |
| 2009/0099882 A1 | 4/2009 | Karabulut |
| 2009/0125612 A1* | 5/2009 | Rabetge et al. ............ 709/220 |
| 2009/0150824 A1 | 6/2009 | Furuichi |
| 2009/0177929 A1 | 7/2009 | Sijelmassi |
| 2009/0193057 A1 | 7/2009 | Maes |
| 2009/0205013 A1 | 8/2009 | Lowes |
| 2009/0281996 A1 | 11/2009 | Liu et al. |
| 2010/0030860 A1 | 2/2010 | Iwasawa et al. |
| 2010/0030880 A1 | 2/2010 | Joshi et al. |
| 2010/0030890 A1 | 2/2010 | Dutta et al. |
| 2010/0064184 A1 | 3/2010 | Almeida et al. |
| 2010/0077455 A1 | 3/2010 | Nishio et al. |
| 2010/0100810 A1 | 4/2010 | Nakamura et al. |
| 2010/0115075 A1 | 5/2010 | Chen et al. |
| 2010/0125477 A1 | 5/2010 | Mousseau et al. |
| 2010/0125665 A1 | 5/2010 | Simpson et al. |
| 2010/0153695 A1 | 6/2010 | Bussard et al. |
| 2010/0235915 A1 | 9/2010 | Memon et al. |
| 2010/0269148 A1 | 10/2010 | Almeida et al. |
| 2010/0281455 A1 | 11/2010 | Anand et al. |
| 2010/0281516 A1 | 11/2010 | Lerner et al. |
| 2011/0035650 A1 | 2/2011 | Jardine-Skinner et al. |
| 2011/0047451 A1 | 2/2011 | Jardine-Skinner et al. |
| 2011/0131275 A1 | 6/2011 | Maida-Smith et al. |
| 2011/0302239 A1 | 12/2011 | Grateau et al. |
| 2011/0321122 A1 | 12/2011 | Mwangi et al. |
| 2012/0054496 A1 | 3/2012 | Abeln et al. |
| 2012/0102182 A1 | 4/2012 | Voskuil et al. |
| 2012/0110093 A1 | 5/2012 | Tingstrom et al. |
| 2012/0131091 A1 | 5/2012 | Yamuna et al. |
| 2012/0131164 A1 | 5/2012 | Bryan et al. |
| 2012/0131469 A1 | 5/2012 | Yamuna et al. |
| 2012/0131641 A1 | 5/2012 | Kavantzas et al. |
| 2012/0131654 A1 | 5/2012 | Kavantzas et al. |
| 2012/0216100 A1 | 8/2012 | Jardine-Skinner et al. |
| 2012/0311309 A1 | 12/2012 | Fillipi et al. |
| 2013/0086184 A1 | 4/2013 | Kavantzas et al. |
| 2013/0086240 A1 | 4/2013 | Bryan et al. |
| 2013/0086241 A1 | 4/2013 | Bryan et al. |
| 2013/0086242 A1 | 4/2013 | Bryan et al. |
| 2013/0086626 A1 | 4/2013 | Kavantzas et al. |
| 2013/0086627 A1 | 4/2013 | Bryan et al. |
| 2013/0262646 A1 | 10/2013 | Fiebig et al. |
| 2014/0013092 A1 | 1/2014 | Fillipi et al. |
| 2014/0109195 A1 | 4/2014 | Kavantzas et al. |
| 2014/0129706 A1 | 5/2014 | Yamuna et al. |

OTHER PUBLICATIONS

Bajaj et al. Web Services Policy Framework (WS-Policy). Mar. 2006. BEA systems Inc. et al. version 1.2. All Pages.*

Christensen et al. Web Services Description Language (WSDL). Mar. 2001. World Wide Web Consortium. version 1.1. All Pages.*

Non Final Office Action for U.S. Appl. No. 13/149,065 (Dec. 4, 201), 29 pages.

Non Final Office Action for U.S. Appl. No. 13/118,940 (Feb. 13, 2013), 9 pages.

Non Final Office Action for U.S. Appl. No. 13/149,049 (Mar. 5, 2013), 14 pages.

U.S. Appl. No. 13/118,940, filed May 31, 2011, Notice of Allowance mailed Jan. 15, 2014, 11 pages.

U.S. Appl. No. 13/436,940 filed Mar. 31, 2012, Final Office Action mailed Jan. 28, 2014, 25 pages.

U.S. Appl. No. 13/118,876, Notice of Allowance mailed on Jun. 12, 2013, 9 pages.

U.S. Appl. No. 13/118,940, Final Office Action mailed on Aug. 29, 2013, 10 pages.

U.S. Appl. No. 13/118,944, Non Final Office Action mailed on May 16, 2013, 31 pages.

U.S. Appl. No. 13/118,944, Notice of Allowance mailed on Oct. 10, 2013, 10 pages.

U.S. Appl. No. 13/149,037, Non-Final Office Action mailed on May 1, 2013, 9 pages.

U.S. Appl. No. 13/149,037, Notice of Allowance mailed on Oct. 8, 2013, 7 pages.

U.S. Appl. No. 13/149,049, Notice of Allowance mailed on Sep. 17, 2013, 10 pages.

U.S. Appl. No. 13/436,940, Non-Final Office Action mailed on Jul. 15, 2013, 31 pages.

Nordbotten, XML and Web Services Security Standards, Communications Surveys & Tutorials, IEEE, vol. 11, No. 3, Oct. 3, 2009, pp. 4-21.

Shute et al., DataPower SOA Appliance Service Planning, Implementation, and Best Practices, IBM Redbook, Jun. 28, 2011, 160 pages.

Bajaj et al., Web Services Policy 1.2- Framework (WS-Policy), W3C Member Submission, version 1.2, Apr. 25, 2006, All pages.

U.S. Appl. No. 13/436,933, Non-Final Office Action mailed on Feb. 20, 2014, 25 pages.

U.S. Appl. No. 14/026,767, Non-Final Office Action mailed on Mar. 4, 2014, 7 pages.

U.S. Appl. No. 13/118,944, Corrected Notice of Allowance mailed on Dec. 16, 2013, 5 pages.

U.S. Appl. No. 13/118,947, Non-Final Office Action mailed on Jun. 20, 2014, 31 pages.

(56) References Cited

OTHER PUBLICATIONS

U.S. Appl. No. 13/436,940, Advisory Action mailed on Apr. 22, 2014, 3 pages.
U.S. Appl. No. 13/596,525, Non Final Office Action mailed on May 30, 2014, 15 pages.
U.S. Appl. No. 13/596,861, Non-Final Office Action mailed on Apr. 10, 2014, 29 pages.
U.S. Appl. No. 13/596,891, Non-Final Office Action mailed on Apr. 25, 2014, 10 pages.
U.S. Appl. No. 13/436,933, Final Office Action mailed on Aug. 29, 2014, 28 pages.
U.S. Appl. No. 13/436,940, Notice of Allowance mailed on Aug. 12, 2014, 13 pages.
U.S. Appl. No. 13/596,545, Non-Final Action mailed on Aug. 4, 2014, 27 pages.
U.S. Appl. No. 13/596,861, Final Office Action mailed on Oct. 3, 2014, 30 pages.
U.S. Appl. No. 13/596,891, Final Office Action mailed on Oct. 2, 2014, 11 pages.
U.S. Appl. No. 14/026,767, Notice of Allowance mailed on Sep. 8, 2014, 9 pages.
U.S. Appl. No. 14/106,037, Non-Final Office Action mailed on Jul. 16, 2014, 16 pages.

* cited by examiner

NONCONFORMING WEB SERVICE POLICY FUNCTIONS

CROSS-REFERENCES TO RELATED APPLICATIONS

This application claims priority from U.S. Provisional Patent Application No. 61/417,176, filed Nov. 24, 2010, entitled "Modeling Advanced Policy Features for Declarative-Based External Security," which is hereby incorporated by reference, as if set forth in full in this document, for all purposes.

This application is also related to following, co-pending U.S. Patent Applications, each of which is hereby incorporated by reference, as if set forth in full in this document, for all purposes: (1) U.S. application Ser. No. 13/149,037, entitled "Identifying Compatible Web Service Policies;" (2) U.S. application Ser. No. 13/118,940, entitled "Optimizing Interactions Between Co-Located Processes;" (3) U.S. application Ser. No. 13/149,049, entitled "Propagating Security Identity Information to Components of a Composite Application;" (4) U.S. application Ser. No. 13/118,944, entitled "Runtime Usage Analysis For A Distributed Policy Enforcement System;" and (5) U.S. application Ser. No. 13/118 947, entitled "Attaching Web Service Policies To A Group Of Policy Subjects," all of which were filed on May 31, 2011.

BACKGROUND

The present invention, in general, relates to web services and, in particular, to using unsupported functions in a web service policy document.

When a web service client intends to interact with a web service, a web service policy document may be transmitted from the web service to the web service client. This web service policy document may inform the web service client about the web service's security requirements. The web service policy document may be required to conform with the WS-Policy Specification, which is the standard language used for web service policy documents. While WS-Policy may allow for security requirements to be exchanged between a web service and web service clients, WS-Policy may be limited in that it does not allow some functions, which an operator of a web service may wish to implement, to be expressed.

SUMMARY

In some embodiments, a method for enforcing a nonconforming web service policy document is presented. The method may include receiving, by the web service computer system, from a web service client computer system, a request for a conforming web service policy document. The conforming web service policy document may be required to conform to the web service descriptor language. The method may include generating, by the web service computer system, the conforming web service policy document using the nonconforming web service policy document. The nonconforming web service policy document may comprise a function unsupported by the web service description language. The method may include transmitting, by the web service computer system, to the web service client computer system, the conforming web service policy document. The method may include enforcing, by the web service computer system, with the web service client computer system, the nonconforming web service policy document. The function that is unsupported by the web service description language may modify enforcement of the web service policy document by the web service computer system. The web service policy document may comprise sufficient information for the web service client computer system to comply with the nonconforming web service policy document.

In some embodiments, the function unsupported by the web service description language indicates whether an element is to be included in the conforming web service policy document. In some embodiments, the function unsupported by the web service description language indicates whether an element in the nonconforming web service policy document is to be enforced by the web service computer system. In some embodiments, the function unsupported by the web service description language indicates a sequence in which elements are executed by the web service computer system. In some embodiments, content of the conforming web service policy document is at least partially determined based on the function unsupported by the web service description language. In some embodiments, content of the conforming web service policy document is further at least partially determined based on a context of the computer web service client computer system. In some embodiments, the function unsupported by the web service description language categorizes an element in the nonconforming web service policy document.

In some embodiments, a computer program product residing on a non-transitory processor-readable medium and comprising processor-readable instructions is presented. The instructions may be configured to cause a processor to receive, from a web service client computer system, a request for a conforming web service policy document. The conforming web service policy document may be required to conform to the web service descriptor language. The instructions may be configured to cause a processor to generate the conforming web service policy document using the nonconforming web service policy document. The nonconforming web service policy document may comprise a function unsupported by the web service description language standard. The instructions may be configured to cause a processor to cause the conforming web service policy document to be transmitted to the web service client computer system. The instructions may be configured to cause a processor to enforce, with the web service client computer system, the nonconforming web service policy document. The function that is unsupported by the web service description language may modify enforcement of the conforming web service policy document by the web service computer system. The web service policy document may comprise sufficient information for the web service client computer system to comply with the nonconforming web service policy document.

In some embodiments, a system for enforcing a nonconforming web service policy document may be presented. The system may include a web service computer system, comprising a processor and a non-transitory computer readable storage medium. The web service computer system may be configured to receive from a web service client computer system, a request for a conforming web service policy document. The web service policy document may be required to conform to the web service descriptor language. The web service computer system may be configured to generate the conforming web service policy document using the nonconforming web service policy document. The nonconforming web service policy document may comprise a function unsupported by the web service description language. The web service computer system may be configured to transmit, to the web service client computer system, the conforming web service policy document. The web service computer system may be configured to enforce with the web service client computer system, the nonconforming web service policy document. The function that is unsupported by the web service description language may modify enforcement of the conforming web service policy document by the web service computer system. The conforming web service policy document may comprise sufficient information for the web service client computer system to comply with the nonconforming web service policy document.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

When a web service client initially contacts a web service, the web service client may transmit a request for a web service policy document. This web service policy document may describe one or more web policies that are required to be adhered to by the web service client in order for the web service client to utilize the web service. For instance, the web service may specify that the web service client is required to transmit a username and a password. Assuming authentication is successful, the web service client may then be permitted to interact with the web service.

The web service policy document, transmitted by the web service to the web service client, may use the WS-Policy specification (which employs the Web Service Description Language (WSDL)). WS-Policy allows for the web service client to receive, in standard form, the requirements of the web service regardless of whether the software and/or hardware operated by the web service client is the same or different from the software and/or hardware operated by the web service.

While WS-Policy may ensure that a web service policy document transmitted by the web service to a web service client can be interpreted by the web service client, WS-Policy may also serve as an enforcement mobile expressing what the web service policy document will have to do. In this case, the entity operating the web service may desire certain features to be expressed in the web service policy document that cannot be expressed using standard WS-POLICY elements. As an example, a web service policy document written in WS-Policy does not allow for an indication of the sequence that various assertions contained within the web service policy document should be performed by the web service. WS-Policy does not allow for an assertion to be contained within the web service policy document but not transmitted to the web service client. Further, some assertions contained within the web service policy document may be desired to be transmitted to the web service client, but not enforced by the web service. As another example, the content of the web service policy document may be desired to vary, depending on the context of the web service client. In this example, multiple web service clients may be attempting to access the web service: some of these web service clients may be internal to a company's intranet, while others may be external. As such, the required security between the web service and the web service client may be varied depending on whether the web service client is internal or external to the company's intranet. Such variation may not be possible using WS-Policy.

While these additional functions, among others, may be expressed by introducing new, nonconforming functions to the web service policy document at the web service, the web service policy document transmitted to the web service client may still be required to conform to WS-Policy. As such, prior to transmitting a web service policy document, a nonconforming web service policy document (which contains nonconforming elements not standard to WS-Policy) may be used to create a conforming web service policy document that is transmitted to the web service client. While functions that are nonconforming may not be present in the conforming web service policy document, the nonconforming functions may alter the contents of the conforming web service policy document. For example, depending on whether the web service client is internal or external to a particular network, the content of the conforming web service policy document may be varied as indicated in the nonconforming web service policy document by one or more nonconforming functions.

Besides modifying the content of the conforming web service policy document transmitted to the web service client, the nonconforming functions present in the nonconforming web service policy document may be used to modify how the web service policy document is processed by the web service. For instance, a nonconforming function related to enforcement may modify what assertions within the nonconforming web service policy document are enforced by the web service. As an example, a web service client may be required to transmit a credit card number to a web service. While a web service policy document may indicate that information received by the web service be logged, due to regulatory concerns regarding the storage of credit card numbers, this particular assertion may not wish to be enforced for credit card numbers. As such, a nonconforming function may indicate that, at the web service, logging is not to be enforced for received credit card numbers.

As will be detailed below, only a selection of the possible nonconforming functions that can be implemented in a nonconforming web service policy document are described herein. As those with skill in the art will recognize, other nonconforming functions can also be implemented in a nonconforming web service policy document, while allowing a conforming web service policy document to be transmitted to web service clients.

Figure 1:
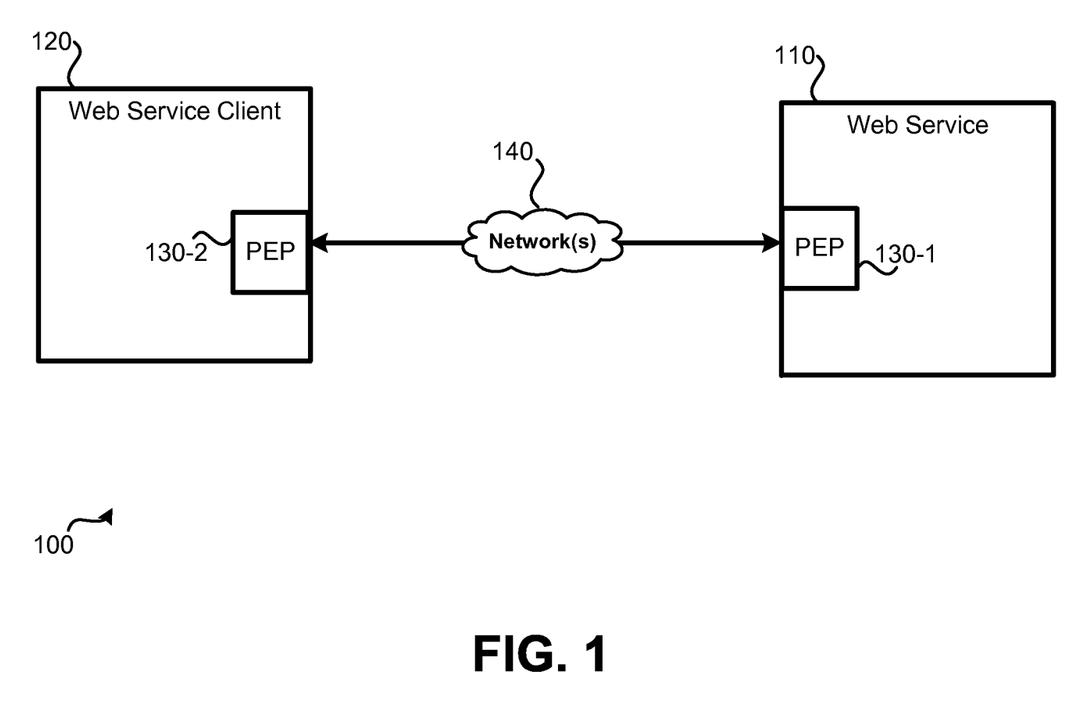
FIG. 1 illustrates an embodiment of a system that includes a web service communicating with a web service client.

FIG. 1 illustrates an embodiment of a system 100 that includes a web service 110 communicating with a web service client 120. System 100 includes: web service 110, web service client 120, policy enforcement points 130, and network(s) 140. Web service 110 can communicate with other entities, such as web service client 120, and provide one or more web services, such as database access. Web service 110 may communicate with web service client 120 using three varieties of programming language: Extensible Markup Language (XML), Standard Object Access Protocol (SOAP), and Web Services Definition Language (WSDL).

Web service client 120 may access web service 110 for one or more services. Policy Enforcement Points (PEPs) 130-1 and 130-2 are components of web service 110 and web service client 120, respectively. Policy Enforcement Points 130 ensure security policies of web service 110 and web service client 120 are implemented and enforced. As such, for web service client 120 and web service 110 to interact, the security measures implemented by both web service client 120 and web service 110 may need to be compatible. As an example, policy enforcement point 130-1 may require that incoming requests from web service client 120 contain a username and password as parts of the request.

Web service 110 and web service client 120 may communicate with each other directly or may communicate with each other via networks 140. Networks 140 may represent one or more networks. For example, networks 140 may represent the Internet or may represent the Internet and a corporate intranet.

When web service client 120 initially contacts web service 110, web service 110 may advertise its security policies by transmitting a web service policy document to web service client 120. The web service policy document, coded using WS-Policy, can contain various security requirements that the web service client is required by the web service to conform to in order to access the one or more services provided by web service 110. The web service policy document may contain requirements that web service client 120 perform "all" of a set of requirements. Alternatively, or additionally, the web service policy document may contain one or more web service policies that require web service client 120 to perform "exactly one" requirement of a set of requirements. As a basic example only, web service 110 may require that web service client 120 provide "exactly" one of: 1) a user and password; or 2) a security certificate in order to access web service 110. Alternatively, web service 110 may require that web service provide "all" of: 1) a user and password; and 2) a security certificate in order to access web service 110. A web service policy document may contain different requirements based on the version of WS-POLICY supported by web service client 120.

Web service 110 may transmit its web service policy document via network 140 to web service client 120. Web service client 120 may identify one or more web service policies in the web service policy document that are compatible with web service client 120. The web service policies that are identified as compatible between the web service client 120 and web service 110 may be implemented by policy enforcement points 130-2 and 130-1. Once implemented, web service client 120 may be able to transmit various requests to web service 110. Web service 110 may then respond and satisfy the request received from web service client 120. As an example, following web service 110 and web service client 120 identifying compatible web service policies, web service client 120, possibly using SOAP, may make a request, such as a database request, to web service 110. Web service 110 may respond to the request with one or more responses, such as results from a search of a database.

While the illustrated embodiment of system 100 contains only web service client 120 communicating with web service 110, it should be understood that additional web service clients may be in communication with web service 110. For example, web service 110 may be in communication with tens, hundreds, or thousands of web service clients simultaneously or nearly simultaneously. Web service 110 and web service client 120 may be implemented as computer systems, such as computer system 600 described in relation to FIG. 6.

Figure 2:
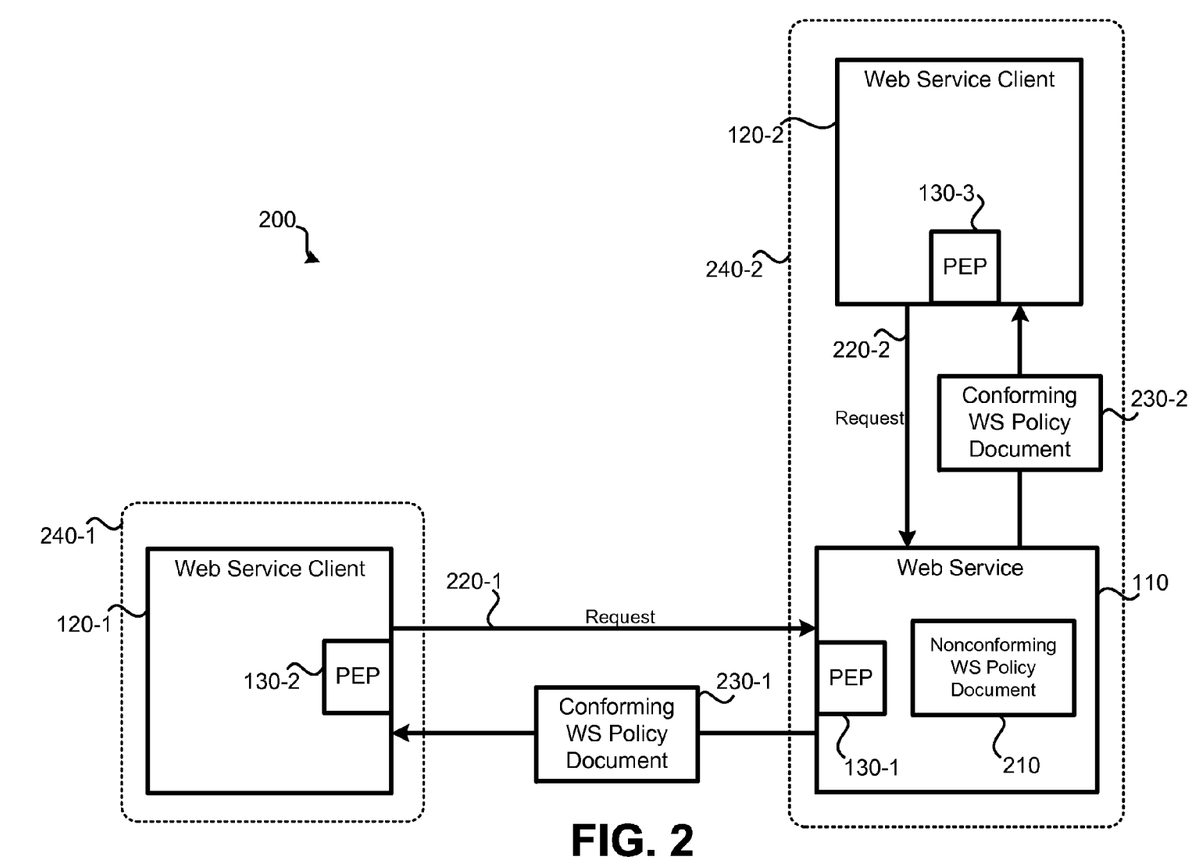
FIG. 2 illustrates an embodiment of a system that includes a web service exchanging a conforming web service policy document with a web service client.

FIG. 2 illustrates an embodiment of a system 200 that includes web service 110 exchanging a conforming web service policy document 230 with web service client 120. In system 200, web service 110 has a nonconforming web service policy document 210. When a request 220 to utilize web service 110 is transmitted to web service 110, web service 110 may use nonconforming web service policy document 210 to create conforming web service policy document 230. A nonconforming web service policy document, such as nonconforming web service policy document 210, refers to a web service policy document that contains elements (such as assertions and/or declarations) that are not part of WS-Policy. As such, a web service client, such as web service client 120, may not be able to interpret the nonconforming elements. As such, a nonconforming web service policy document does not meet WS-Policy standard of any version of WS-Policy. A conforming web service policy document, such as conforming web service policy document 230, refers to a web service policy document that contains only elements standard to WS-Policy. Accordingly, a conforming web service policy document meets WS-Policy standard (of at least one version of WS-Policy).

Web service client 120-1 may transmit request 220-1 when web service client 120-1 attempts to access web service 110. Request 220-1 may indicate that web service client 120-1 wants to access web service 110. Request 220-1 may contain various information regarding web service client 120-1, such as the IP address on web service client 120-1. Upon receiving request 220-1, web service 110 may access nonconforming web service policy document 210. Web service 110 may create conforming web service policy document 230-1 using nonconforming web service policy document 210. In some embodiments, one or more previously created conforming web service policy documents created using nonconforming web service policy document 210 may be stored by web service 110. In such embodiments, based on the content of request 220-1, one of the previously created conforming web service policy document is transmitted to web service client 120-1.

The content of conforming web service policy document 230-1 may be modified based on the nonconforming functions of nonconforming web service policy document 210. For instance, nonconforming web service policy document 210 may contain nonconforming functions that determine the content of the conforming web service policy documents transmitted to web service clients based on a context of the web service clients. In system 200, web service client 120-1 is located on network 240-1, while web service 110 is located on network 240-2. Thus, web service client 120-1 may be considered "external" to web service 110. Web service client 120-2 is located on network 240-2, which is the same network as web service 110. Thus, web service client 120-2 may be considered "internal" to web service 110. Whether a web service client is "external" (e.g., a web service client accesses web service 110 from a different network or using a public network, such as the Internet) or "internal" (e.g., a web service client accesses a web service via an intranet) may result in different conforming web service policy documents being transmitted to the web service clients. Whether a web service client is internal or external to a web service may be referred to as the "context" of the web service client. Other factors may be evaluated to determine a context of a web service client. For example, the context of a web service client could be based on the time of day, day of week, number of requests from other web service clients being received, physical location of the web service client, and/or other factors.

The context of web service client 120-1 to web service 110 is external (because web service client 120-1 communicates with web service 110 via the Internet). Request 220-1 may contain an indication that web service client 120-1 is external. One or more nonconforming assertions within nonconforming web service policy document 210 may indicate that the web policies available to external web service clients are different from the web service policies advertised to web service clients with an internal context. As such, conforming web service policy document 230-1 may contain elements different from elements transmitted to internal web service clients.

In contrast, the context of web service client 120-2 to web service 110 is internal (because web service client 120-2 communicates with web service 110 via local network 240-2). Request 220-2, similar to request 220-1, may contain an indication that web service client 120-2 is internal, such as an IP address. One or more nonconforming assertions within nonconforming web service policy document 210 may result in web policies being advertised as available to internal web service clients that are not available to external web service clients. As such, conforming web service policy document 230-2 may contain elements different from elements present in conforming web service policy document 230-1.

Besides affecting what elements are contained in conforming web service policy document 230, nonconforming functions may also affect how web service policies are processed by web service 110. Nonconforming elements present in nonconforming web service policy document 210 may indicate a sequence in which elements of nonconforming web service policy document 210 are processed by web service 110. Nonconforming elements present in nonconforming web service policy document 210 may indicate assertions, declarations and/or other elements that are not to be included in conforming web service policy document 230. These nonconforming elements may be referred to as "silent" elements. Nonconforming elements present in nonconforming web service policy document 210 may indicate assertions, declarations and/or other elements that are included in conforming web service policy document 230 but not enforced by web service 110. These nonconforming elements may be referred to as "enforce" elements. As an example of a situation of an element that may not wish to be enforced by the web service, consider web service 110 receiving a credit card number (or some other sensitive piece of information, such as a Social Security number) from web service client 120-1. Due to regulatory requirements and/or security requirements, the credit card number may not be desired to be logged by web service 110. As such, enforcement of the logging of the credit card number can be prevented by web service 110. Another nonconforming element that may be present in nonconforming web service policy document 210 serves as a category identifier. Such a category identifier may be used to determine whether nonconforming web service policy document 210 has conflicting assertions (or other elements). For example, some or all of the elements within nonconforming web service policy document 210 may be assigned a category. The presence of more than one (or some other number) element within a particular category may indicate a likelihood of conflicting elements. As such, a designer can be prompted to address the potential error.

Figure 3:
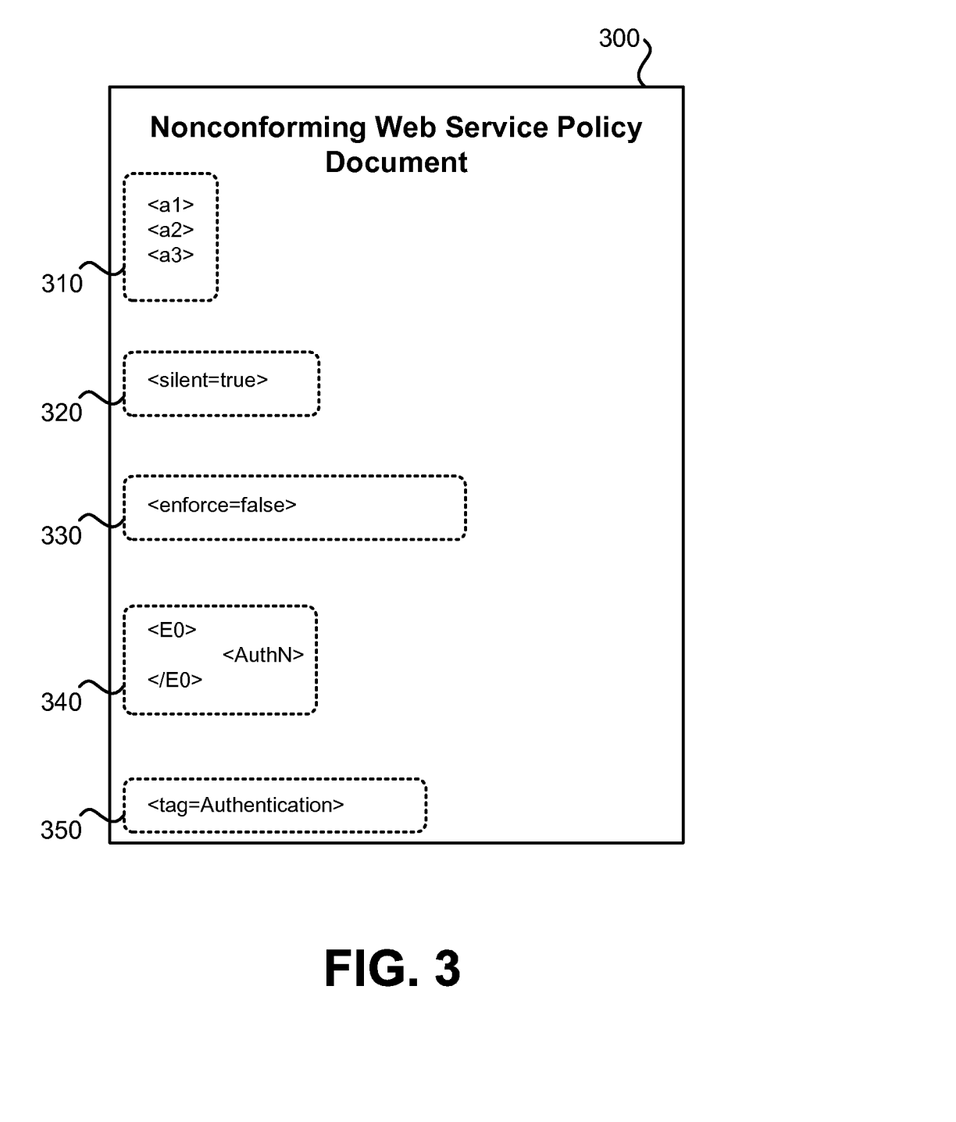
FIG. 3 illustrates an embodiment of a nonconforming web service policy document containing functions not supported by WS-Policy.

FIG. 3 illustrates an embodiment of a nonconforming web service policy document 300 containing nonconforming functions that are not supported by WS-Policy. Nonconforming web service policy document 300 contains pseudo-code that represents examples of various nonconforming assertions that may be present in nonconforming web service policy document 300. Nonconforming web service policy document 300 may represent nonconforming web service policy document 210 of FIG. 2.

Sequence elements 310 may be nonconforming elements. Sequence elements 310 may be used to identify a particular order in which assertions (or other elements) are to be evaluated by the web service associated with nonconforming web service policy document 300. As an example of a situation where sequencing may be useful, consider an authentication element followed, later in the same sequence, by an authorization element. It can be required to perform authentication (e.g., confirm web service client is a valid entity) before performing authorization (e.g., determining whether the web service client has sufficient privileges to perform a particular operation). From the perspective of the web service client, this sequence can be considered inconsequential: the web service client may provide credentials, the sequence of authentication followed by authorization may only be pertinent to the web service. When nonconforming web service policy document 300 is used to generate a conforming web service policy document, sequence elements 310 may be removed and may not be present.

Silent element 320 may also be a nonconforming element. Silent element 320 may have a value of either true or false. Silent element 320 may be used to identify whether another element should or should not be present in the conforming web service policy document. For example, if an element is linked with silent element 320 when silent element 320 has a value of true, that element may not be included in the conforming web service policy document. If an element is linked with silent element 320 when silent element 320 has a value of false, that element may be included in the conforming web service policy document. Whether true or false, the element linked with the silent element may be executed by the web service.

Enforce element 330 may also be an nonconforming element. Enforce element 330 may have a value of either true or false. Enforce element 330 may be used to identify whether another element (such as an assertion) should or should not be performed by the web service. Enforce element 330 may be independent of silent element 320. For example, if silent element 320 is set to false and enforce element 330 is also set to false, one or more elements associated with silent element 320 and enforce element 330 may be included in the conforming web service policy document. However, enforcement of these elements may not occur at the web service. This may allow the web service to advertise non-processable requirements to its web service clients, for example a web service can declare that it supports "English" language as its default textual description of input/output required and provided by this web service. As another example, if enforce is set to true and silent is set to true for a set of elements, the elements may be enforced by the web service, but not transmitted to, or enforced by, the web service client. For example, an authorization can be enforced by a web service but is not visible to its web service clients.

Guard element 340 may be another nonconforming element. Guard element 340 may allow for varying elements to be enforced by the web service. One possible context that can be used is a differentiation between internal and external web service clients. Internal web service clients may refer to web service clients that are located on the same local area network as the web service or have been granted trusted status. External web service clients may refer to web service clients that communicate with the web service via the Internet or from some other network or have not been granted trusted status. Referring to guard element 340, indicators can be placed around a set of elements that are used to enforce different behavior based on whether internal or external web service clients are invoking this web service. The example of an "E0" indicators of guard element 340 may serve to indicate that the "AuthN" element is only enforced if external web service clients are calling in. A similar indicator, such as "I0," may serve to indicate other elements that are to be enforced only if internal web service clients are calling in. While the context of web service clients may be distinguished on the basis of external and internal enforcement, other contexts can also be possible.

Category element 350 is an example of another nonconforming element. Category element 350 allows for other elements to be tagged with a category. Assigning a category to some or all of the elements present in nonconforming web service policy document 300 may allow for mistakes, errors, or other problems to be located easier. For example, if multiple instances of elements tagged "Authentication" appear, it may be likely that only one instance was intended to be present. Thus, a programmer can be alerted by the web service that the nonconforming web service policy document has an unexpected number of elements with a particular tag.

When nonconforming web service policy document 300 is used to create a conforming web service policy document, each instance of a nonconforming element may be removed to create a conforming web service policy document. Referring to sequence elements 310, such sequence elements may not be inserted into the conforming web service policy document. Referring to silent element 320, each element, or set of elements, indicated as silent (e.g., silent is true) may not be inserted into the conforming web service policy document; each element, or set of elements, indicated as not silent (e.g., silent is false) may be included in the conforming web service policy document, with the associated silent element removed. Referring to enforce element 330, each instance may be removed because enforce element 330 only may indicate to the web service whether an element or set of elements should be enforced. Elements linked with enforce element 330 may be inserted into the conforming web service policy document. However, if enforce element 330 is paired with silent element 320 that is linked with an element or group of elements and the silent element is set to true, the element or group of elements may not be inserted into the conforming web service policy document. An element or set of elements linked with guard element 340 can be inserted into a conforming web service policy document depending on silent element 320. Each instance of a category element, such as category element 350, may not be inserted in a conforming web service policy document.

Figure 4:
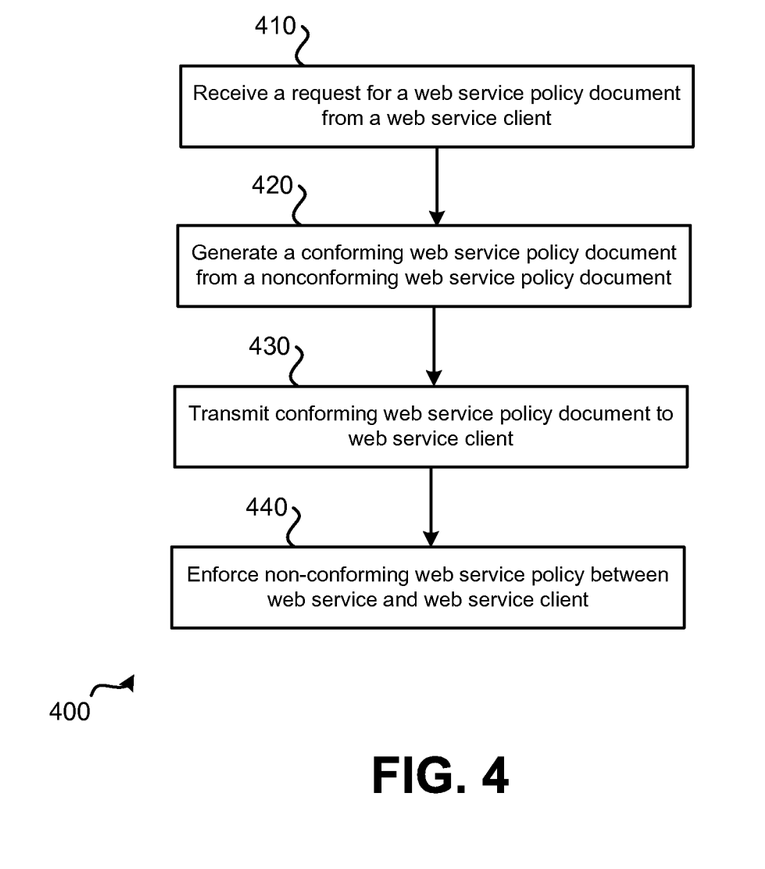
FIG. 4 illustrates an embodiment of a method for using a nonconforming web service policy document.

The systems of FIGS. 1 and 2 and nonconforming web service policy documents, such as nonconforming web service policy document 300 of FIG. 3, may be used to perform various methods. FIG. 4 illustrates an embodiment of a method 400 for using a nonconforming web service policy document. Method 400 may be performed by system 200 of FIG. 2 or some other system that includes a web service exchanging a conforming web service policy document with a web service client. At stage 410, a request for a web service policy document may be received by a web service from a web service client. For example, referring to FIG. 2, web service client 120-1 may transmit a request 220-1 to web service 110. Accordingly, web service 110 may receive request 220-1 from web service client 120-1. This request may contain information about the web service client. Information may include what web service the web service client is attempting to access, and/or the web service client's IP address. Other information may also be present in the request.

At stage 420, a conforming web service policy document may be generated by the web service from a nonconforming web service policy document. Generating the conforming web service policy document may include evaluating various nonconforming elements of the nonconforming web service policy document, such as silent elements described in relation to nonconforming web service policy document 300 of FIG. 3, to determine if conforming elements linked with these nonconforming elements are to be included in the conforming web service policy document. Other nonconforming elements, such as sequence elements, enforce elements, and category elements, may not be inserted in the conforming web service policy document.

In some embodiments, conforming web service policy document may have been created before the request is received at stage 410. As such, a conforming web service policy document created by the web service using the nonconforming web service policy document may be stored, then, when requested by a web service client, transmitted to the web service client.

At stage 430, the conforming web service policy document may be transmitted to the web service client that the request was received from stage 410. The conforming web service policy document conforms to WS-Policy. As such, the web service client may not need to interpret any nonconforming elements that are present in the nonconforming web service policy document stored by the web service.

At stage 440, at the web service, a web service policy in accordance with the nonconforming web service policy document may be enforced by a policy enforcement point. From the web service client side, it may appear that a web service policy from the conforming web service policy document is being enforced. However, the web service may be utilizing nonconforming elements that do not affect the messaging between the web service and the web service client. For example, nonconforming elements, such as enforce elements, sequence elements, and category elements may be used by the web service despite these nonconforming elements not being present in the conforming web service policy document transmitted to the web service client at stage 430. If the nonconforming web service policy document contains guard elements, the enforcement may vary depending on a context of the web service client, such as whether it is internal or external to the network of the web service.

Figure 5:
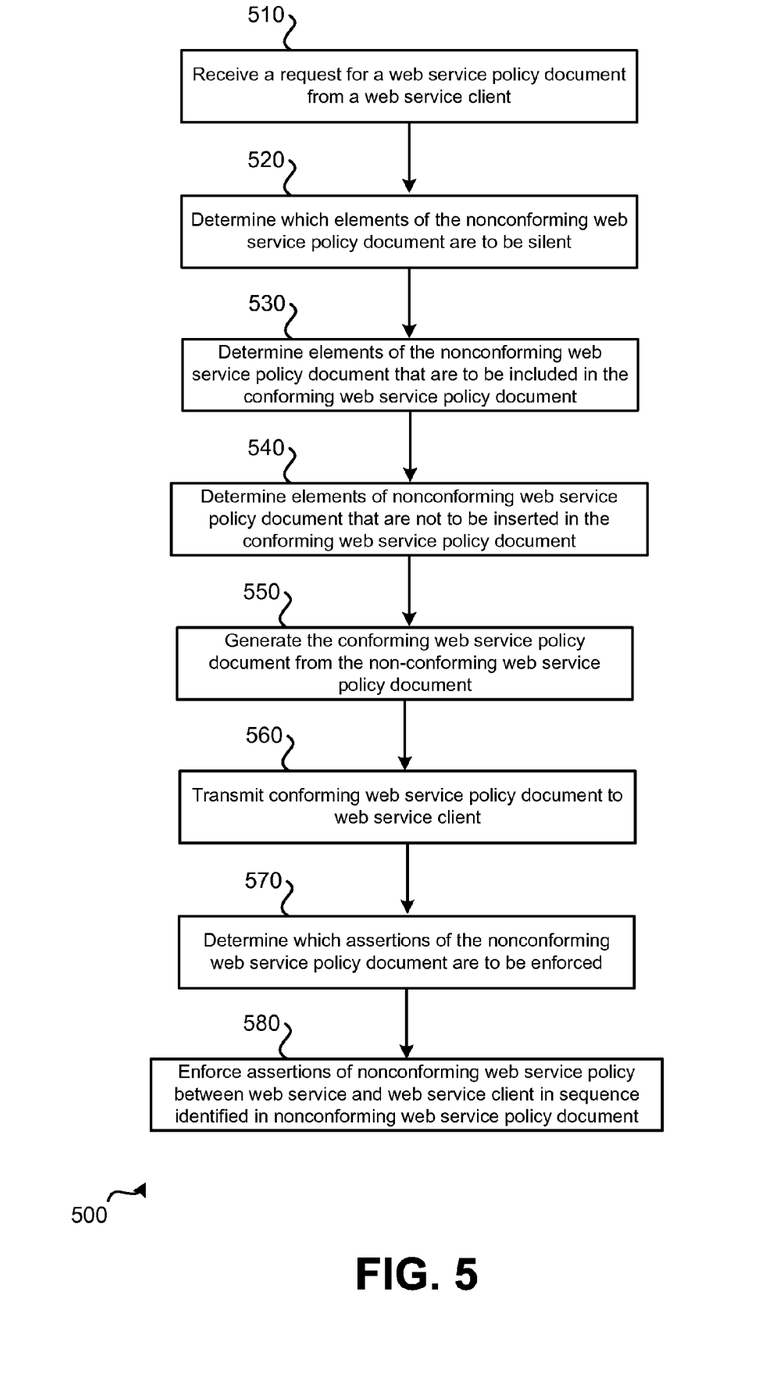
FIG. 5 illustrates another embodiment of a method for using a nonconforming web service policy document.

FIG. 5 illustrates another embodiment of a method 500 for using a nonconforming web service policy document. Method 500 may represent the same method as method 400 of FIG. 4. As such, method 500 may be performed using system 100 of FIG. 1, system 200 of FIG. 2, or some other system that includes a web service exchanging a conforming web service policy document with a web service client. At stage 510, a request for a web service policy document may be received by a web service from a web service client. For example, referring to FIG. 2, web service client 120-2 may transmit a request 220-2 to web service 110. Accordingly, web service 110 may receive request 220-2 from web service client 120-2. This request may contain information about the web service client. Information may include what web service the web service client is attempting to access, and/or the web service client's IP address. Other information may also be present in the request. In the example of web service client 120-2, the web service client may have a context of internal, because both web service 110 and web service client 120-2 are on network 240-2.

At stage 520, elements of the nonconforming web service policy document that are intended to be silent, and, thus, not included in the conforming web service policy document, may be identified. Therefore, any elements linked with a silent element set to "true" may not be inserted in the conforming web service policy document. Conversely, any elements linked with a silent element set to "false" may be inserted in the conforming web service policy document, with only the silent element itself removed.

At stage 530, elements of the nonconforming web service policy document that are to be included in the conforming web service policy document based on the context of the web service client may be determined. One or more guard elements, such as guard element 340 of FIG. 3, may be used to identify various elements are to be included in a conforming web service policy document based on the context of the web service client.

At stage 540, elements of the nonconforming web service policy that are not to be inserted in the conforming web service policy document may be identified. These elements may include nonconforming elements, such as enforce elements, sequence elements, and category elements. At stage 550, the conforming web service policy document is generated. The conforming web service policy document may not contain any elements that do not conform to a version of WS-Policy.

At stage 570, the conforming web service policy document may be transmitted to the web service client that transmitted the request received at stage 510. The conforming web service policy document conforms to WS-Policy. As such, the web service client does not need to interpret any nonconforming elements that may be present in the nonconforming web service policy document stored by the web service.

At stage 580, at the web service, a web service policy in accordance with the nonconforming web service policy document may be enforced. From the web service client side, it may appear that a web service policy from the conforming web service policy document is being enforced. As such, messaging between the web service and web service client conforms to WS-Policy. However, the web service may be utilizing nonconforming elements that do not affect the messaging between the web service and web service client or what information the web service client is required to transmit to the web service. For example, nonconforming elements, such as enforce elements, silent elements, sequence elements, and category elements may be utilized by the web service despite these nonconforming elements not being present in the conforming web service policy document transmitted to the web service client at stage 560. If the nonconforming web service policy document contains guard elements, the enforcement of the conforming web policy document may vary depending on the context of the web service client, such as whether it is internal or external to the network of the web service.

Figure 6:
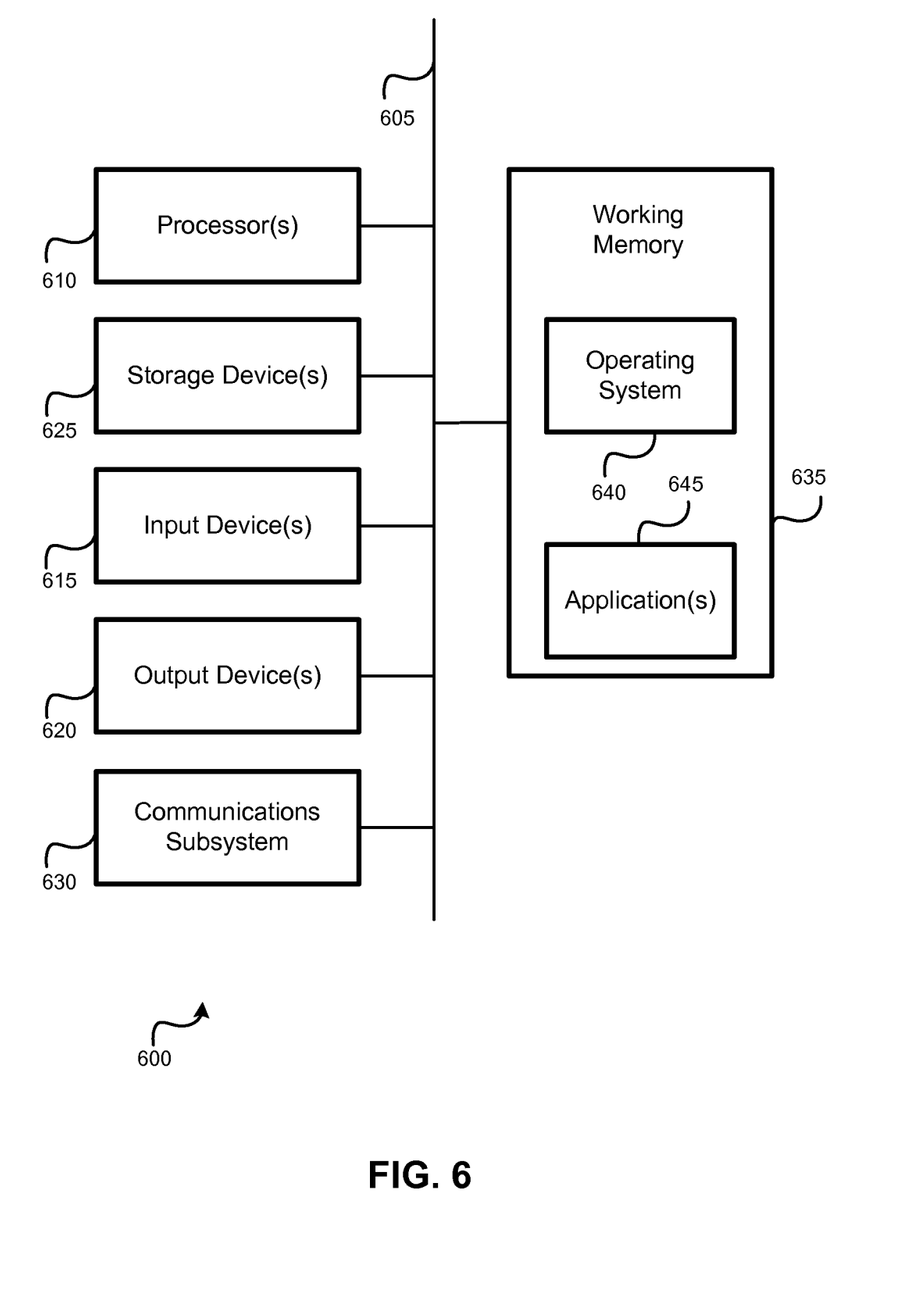
FIG. 6 illustrates an embodiment of a computer system.

The various web services and web service clients detailed herein may be computer systems. FIG. 6 illustrates an embodiment of a computer system. A computer system as illustrated in FIG. 6 may be incorporated as part of the previously described computerized devices. For example, computer system 600 can be used to implement a web service, a web service client, a policy manager application, and/or a user terminal. FIG. 6 provides a schematic illustration of one embodiment of a computer system 600 that can perform the methods provided by various other embodiments, as described herein, and/or can function as the host computer system, a remote kiosk/terminal, a point-of-sale device, a mobile device, and/or a computer system. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of communications subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a method or process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for enforcing a nonconforming web service policy document, the method comprising:
   receiving, by a web service computer system, from a web service client computer system, a request for a conforming web service policy document, wherein:
      the conforming web service policy document is required to conform to the web service description language;
      the conforming web service policy document specifies security requirements between the web service computer and the web service client computer system;
   generating, by the web service computer system, dynamically in response to the request from the web service client computer system, the conforming web service policy document using the nonconforming web service policy document, wherein:
      the nonconforming web service policy document expressed in the web service description language and comprising at least one element conforming to web service description language and at least one element not conforming to the web service description language including at least a generating function unsupported by the web service description language that is used to generate a conforming document based on the request and the nonconforming web service policy document, the generating function comprising at least a silent element for identifying if another element should be included in the conforming document;
      the nonconforming web service policy document specifies security requirements between the web service computer and the web service client computer system;
      the nonconforming web service policy document is stored on the web service computer system;
      the content of the conforming web service policy document is generated from the nonconforming web service policy document at least partially based on a context of the web service client computer system;
   transmitting, by the web service computer system, to the web service client computer system, the conforming web service policy document; and
   enforcing, by the web service computer system, with the web service client computer system, security requirements specified in the nonconforming web service policy document, wherein:
      the nonconforming web service policy document comprises an enforcing function unsupported by the web service description language that is used to affect how web service policies are processed by the web service, the enforcing function comprising at least one of:
         a sequence element for identifying an order in which assertions are to be evaluated, or
         a guard element for specifying which elements to enforce based on a context of the client;
      the enforcing function that is unsupported by the web service description language is utilized for enforcement of the conforming web service policy document by the web service computer system; and
      the conforming web service policy document comprises sufficient information for the web service client computer system to comply with the security requirements specified in nonconforming web service policy document.

2. The method for enforcing the nonconforming web service policy document of claim 1, wherein the enforcing function unsupported by the web service description language further includes an enforce element that indicates whether an element in the nonconforming web service policy document is to be enforced by the web service computer system.

3. The method for enforcing the nonconforming web service policy document of claim 1, wherein the sequence element further indicates a sequence in which elements are executed by the web service computer system.

4. The method for enforcing the nonconforming web service policy document of claim 1, wherein content of the conforming web service policy document is at least partially determined based on the generating function unsupported by the web service description language.

5. The method for enforcing the nonconforming web service policy document of claim 1, wherein the enforcing function unsupported by the web service description language further included a category element that categorizes other elements in the nonconforming web service policy document.

6. A computer program product residing on a non-transitory processor-readable medium and comprising processor-readable instructions configured to cause a processor to:
   receive, from a web service client computer system, a request for a conforming web service policy document, wherein:
      the conforming web service policy document is required to conform to the web service description language;
      the conforming web service policy document specifies security requirements between the web service computer and the web service client computer system;
   generate, dynamically in response to the request from the web service client computer system, the conforming web service policy document using a nonconforming web service policy document, wherein:
      the nonconforming web service policy document expressed in the web service description language and comprising at least one element conforming to web service description language and at least one element not conforming to the web service description language including at least a generating function unsupported by the web service description language that is used to generate a conforming document based on the request and the nonconforming web service policy document, the generating function comprising at least a silent element for identifying if another element should be included in the conforming document;
      the nonconforming web service policy document specifies security requirements between the web service computer and the web service client computer system;
      the nonconforming web service policy document is stored on the web service computer system;
      the content of the conforming web service policy document is generated from the nonconforming web service policy document at least partially based on a context of the web service client computer system;
   cause the conforming web service policy document to be transmitted to the web service client computer system; and
   enforce, with the web service client computer system, security requirements specified in the nonconforming web service policy document, wherein:
      the nonconforming web service policy document comprises an enforcing function unsupported by the web service description language that is used to affect how web service policies are processed by the web service, the enforcing function comprising at least one of:
         a sequence element for identifying an order in which assertions are to be evaluated, or a guard element for specifying which elements to enforce based on a context of the client;

the enforcing function that is unsupported by the web service description language is utilized for enforcement of the conforming web service policy document by a web service computer system; and the conforming web service policy document comprises sufficient information for the web service client computer system to comply with the security requirements specified in nonconforming web service policy document.

7. The computer program product of claim 6, wherein the enforcing function unsupported by the web service description language further includes an enforce element that indicates whether an element in the nonconforming web service policy document is to be enforced by the web service computer system.

8. The computer program product of claim 6, wherein the sequence element further indicates a sequence in which elements are executed by the web service computer system.

9. The computer program product of claim 6, wherein content of the conforming web service policy document is at least partially determined based on the generating function unsupported by the web service description language.

10. The computer program product of claim 6, wherein the enforcing function unsupported by the web service description language further included a category element that categorizes other elements in the nonconforming web service policy document.

11. A system for enforcing a nonconforming web service policy document, the system comprising:

a web service computer system, comprising a processor and a non-transitory computer readable storage medium, wherein the web service computer system is configured to:

receive from a web service client computer system, a request for a conforming web service policy document, wherein:

the conforming web service policy document is required to conform to the web service description language;

the conforming web service policy document specifies security requirements between the web service computer and the web service client computer system;

generate, dynamically in response to the request from the web service client computer system, the conforming web service policy document using the nonconforming web service policy document, wherein:

the nonconforming web service policy document expressed in the web service description language and comprising at least one element conforming to web service description language and at least one element not conforming to the web service description language including at least a generating function unsupported by the web service description language that is used to generate a conforming document based on the request and the nonconforming web service policy document, the generating function comprising at least a silent element for identifying if another element should be included in the conforming document;

the nonconforming web service policy document specifies security requirements between the web service computer and the web service client computer system;

the nonconforming web service policy document is stored on the web service computer system;

the content of the conforming web service policy document is generated from the nonconforming web service policy document at least partially based on a context of the web service client computer system;

transmit to the web service client computer system, the conforming web service policy document; and enforce with the web service client computer system, security requirements specified in the nonconforming web service policy document, wherein:

the nonconforming web service policy document comprises an enforcing function unsupported by the web service description language that is used to affect how web service policies are processed by the web service, the enforcing function comprising at least one of:

a sequence element for identifying an order in which assertions are to be evaluated, or a guard element for specifying which elements to enforce based on a context of the client;

the enforcing function that is unsupported by the web service description language is utilized for enforcement of the conforming web service policy document by the web service computer system; and the conforming web service policy document comprises sufficient information for the web service client computer system to comply with the security requirements specified in nonconforming web service policy document.

12. The system for enforcing the nonconforming web service policy document of claim 11, wherein the web service computer system is further configured such that the enforcing function unsupported by the web service description language further includes an enforce element that indicates whether an element in the nonconforming web service policy document is to be enforced by the web service computer system.

13. The system for enforcing the nonconforming web service policy document of claim 11, wherein the web service computer system is further configured such that the sequence element further indicates a sequence in which elements are executed by the web service computer system.

14. The system for enforcing the nonconforming web service policy document of claim 11, wherein the web service computer system is further configured such that content of the conforming web service policy document is at least partially determined based on the generating function unsupported by the web service description language.

15. The system for enforcing the nonconforming web service policy document of claim 11, wherein the web service computer system is further configured such that the enforcing function unsupported by the web service description language further included a category element that categorizes other elements in the nonconforming web service policy document.

* * * * *

UNITED STATES PATENT AND TRADEMARK OFFICE
CERTIFICATE OF CORRECTION

| | | |
|---|---|---|
| PATENT NO. | : 9,021,055 B2 | |
| APPLICATION NO. | : 13/149065 | |
| DATED | : April 28, 2015 | |
| INVENTOR(S) | : Kavantzas et al. | |

It is certified that error appears in the above-identified patent and that said Letters Patent is hereby corrected as shown below:

In the specification,

In column 1, line 24, delete "13/118 947," and insert -- 13/118,947, --, therefor.

Signed and Sealed this
Ninth Day of February, 2016

Michelle K. Lee
*Director of the United States Patent and Trademark Office*